June 17, 1958 — R. B. TEMPLE — 2,839,335
ADJUSTABLE TREAD WHEEL CLAMP
Filed May 14, 1956

INVENTOR.
ROBERT B. TEMPLE
BY Whittemore, Hulbert
Belknap 2,839,335
Patented June 17, 1958

2,839,335
ADJUSTABLE TREAD WHEEL CLAMP

Robert B. Temple, Detroit, Mich., assignor to Kelsey-Hayes Company, a corporation of Delaware Application May 14, 1956, Serial No. 584,605

8 Claims. (Cl. 301—9)

The present invention relates to an adjustable tread wheel of the type employed in tractors; and more particularly to improved means for clamping the wheel rim and disk or body together in an axially adjusted position of the former following relative rotation of the rim and body.

It is a general object of the invention to provide a clamp which corrects an inherent weakness of the common jackscrew type of rim clamp, i. e., its inability to provide a satisfactory strong and stable column support between the rim and wheel body under circumferential and transverse forces attending the operation of the vehicle.

A more specific object is to provide such clamping means in the form of a plurality of individual rail engaging clamps spaced circumferentially about the wheel body, each clamp including an arched, pivotally mounted clamp member or jaw which directly transmits radial rim clamping thrust at a medial arch of the jaw, and an adjustable actuating screw releasably sustaining the jaw, preferably adjacent an end thereof remote from its pivotal or fulcrum end. The arch engages the sides of an inclined rail on the rim to cause the desired axial adjustment, upon the relative rotation described; and the arrangement is such that the member greatly stabilizes the clamp as a whole and relieves the screw of a major part of the load, when the clamp is actuated to secure the wheel parts together.

Another object is to provide a clamp of this character in which the screw is threadedly engaged in a split locking socket, by which it is tightly held in any condition of adjustment.

The foregoing as well as other objects will be made more apparent as this description proceeds, especially when considered in connection with the accompanying drawings, wherein.

Figure 4:
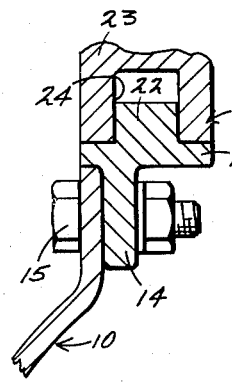
Figure 3:
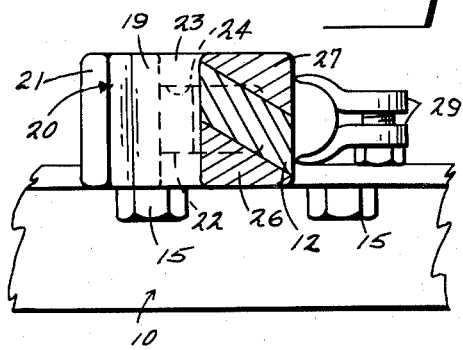
Figure 1:
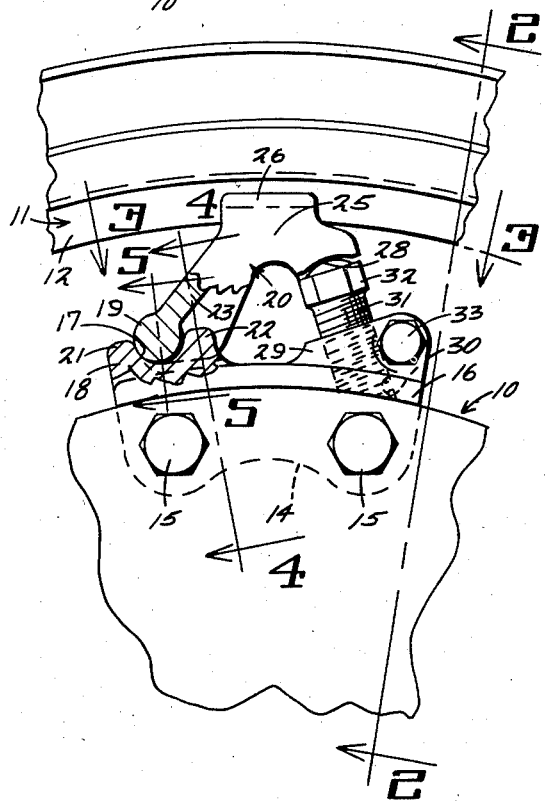
Fig. 1 is a fragmentary elevational view of the outboard side of an adjustable tread wheel embodying the improved clamp, being partially broken away and in section on a radial plane through the axial center of the clamp, i. e., along line 1—1 of Fig. 2.
Figure 5:
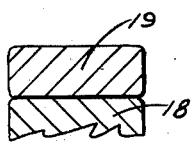

Figs. 3, 4 and 5 are, respectively, views in section along lines 3—3, 4—4 and 5—5 of Fig. 1.

Figure 2:
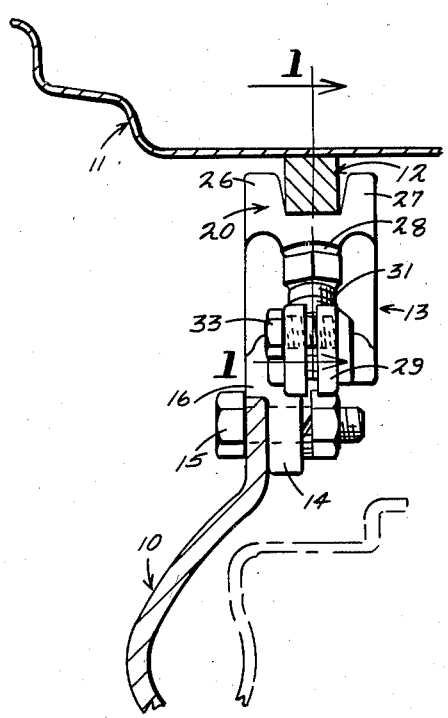
Fig. 2 is an end view from the line 2—2 of Fig. 1.

Referring to Figs. 1 and 2 of the drawings, a conventional tractor wheel body 10 of appropriately shaped cross section and peripheral outline is shown, while the numeral 11 designates a standard wheel rim having a series of circumferentially spaced, axially inclined rails 12 welded to its inner peripheral surface.

The clamps 13 of the invention, of which there is one for each rail, are mounted on and about the periphery of wheel body 10 radially inwardly of the respective rails; and the clamps 13 cammingly engage the rails 12 in a known manner to effect axial adjustment of the rim 11 upon relative rotation of the rim and rail when the clamps are released or backed off.

Each clamp 13 comprises a mounting bracket 14 secured by bolts 15 to the wheel body with an integral flange 16 of the bracket axially overlapping the margin of the body 10 and in circumferential conformity therewith. Other types of bracket mounting may, of course, be employed for other types of wheel body.

An axially extending, radially outwardly opening pivot seat or fulcrum 17 of approximately semi-cylindrical shape is formed on an integral boss 18 at one circumferential end of the bracket 14 to receive a generally cylindrical integral pivot 19 of a special arched clamped member or jaw 20 of the clamp 13. The seat 17 is formed between a full width outer end rib 21 of the boss 18 and a partial width inner rib 22 thereof, which is axially centered in relation to the rib 21. In order to straddle the smaller rib 22, the pivot carrying arm 23 of the arched jaw 20 is centrally recessed at 24.

The medial arched jaw portion proper of jaw or clamp member 20, which arch is designated 25, has a pair of integral, axially spaced guide lugs 26, 27 at its radially outermost apex portion. Jaw portion 25 also has a concave, inwardly facing thrust seat 28 of spherical form on the side of the lugs 26, 27 opposite its pivot or fulcrum at 19.

A radially outward, circumferentially split extension 29 is formed integrally on the bracket 14, which extension affords a split, internally threaded socket at 30, and socket 30 receives an actuating bolt or stud 31 having a rounded hex head or thrust nose 32. The nose 32 abuts the concave seat 28 of the clamp jaw 20.

A lock screw 33 threadedly engages the socket extension 29 to tightly secure the belt 31 in any adjusted position.

It is evident that rotation of the bolt 31 to advance it outwardly will cause jaw 20 to pivot on its fulcrum seat 17 and clamp the jaw arch against the rim 11. Opposite rotation releases the jaw to free the rim for relative rotation and axial adjustment. In the desired adjusted position of the rim, the bolt is actuated to re-clamp the rim, and is held against accidental loosening when the screw 33 is taken up tightly.

Rim adjustment is effected in the usual way, upon relative rotation of the wheel body 10, by the camming action of the forked lugs 26, 27 of the clamp 13 on the inclined rim rail 12.

The fulcrumed arch jaw 20 receives the major part of the radial thrust load, and greatly stabilizes the column strength of the clamp 13 to resist transverse forces arising in the operation of the tractor, whether in torque or in axial thrust. Due to the arched shape of clamp 13 and its fulcruming as a second class lever, a shorter and smaller bolt may be employed for the actuator 31, with a lesser area of threaded exterior exposed to corrosion or damage in use. The clamp construction is a very inexpensive one, for the mounting and fulcruming bracket 14 may be formed as a casting, while the jaw 20 is a relatively inexpensive forging. The clamp has stability and load carrying capacity which make it a material improvement over previously employed jackscrew clamps.

What I claim as my invention is:

1. A releasable clamp for an adjustable tread wheel of the type having an inclined rail on its rim acting to adjust the latter axially upon relative rotation of a coaxial body, said clamp comprising a jaw pivotally mounted on a peripheral portion of said wheel body, said jaw including guide elements outwardly straddling said rail and a portion releasably clamping said rail radially upon outward swinging of the jaw, and an actuator in operative threaded engagement between said wheel body and jaw to swing the latter about its pivot upon rotation of the actuator.

2. A releasable clamp for an adjustable tread wheel of the type having an inclined rail on its rim acting to adjust the latter axially upon relative rotation of a coaxial body, said clamp comprising a jaw pivotally mounted against an end thereof on a peripheral portion of said wheel body, said jaw having in spaced relation to its pivot forked guide elements outwardly straddling said rail and a portion between said elements which releasably clamps said rail radially upon outward swinging of the jaw, and an actuator in operative threaded engagement with said wheel body and engaging said jaw to swing the latter about its pivot upon rotation of the actuator.

3. A releasable clamp for an adjustable tread wheel of the type having an inclined rail on its rim acting to adjust the latter axially upon relative rotation of a coaxial body, said clamp comprising a jaw pivotally mounted adjacent an end thereof on a peripheral portion of said wheel body, said jaw having an outwardly arched portion spaced from its pivot which straddles and releasably clamps said rail upon swinging of the jaw, and an actuator in operative threaded engagement with said wheel body and engaging said jaw in spaced relation to its pivot and rail straddling portion to swing the jaw about its pivot upon rotation of the actuator.

4. An adjustable tread wheel comprising a wheel body, a coaxial rim having an inclined rail on its inner periphery, and means engageable with said rail to adjust said rim axially upon relative rotation of said rim and body, and to clamp said rim in adjusted position, comprising a jaw pivotally mounted adjacent an end thereof on a peripheral portion of said wheel body, said jaw having an outwardly arched forked portion spaced from its pivot which outwardly straddles said rail and releasably clamps said rail upon swinging of the jaw, and an actuator in operative threaded engagement with said wheel body and engaging said jaw to swing the latter about its pivot upon rotation of the actuator, said actuator engaging said jaw at a side of said outwardly arched portion remote from said pivot.

5. A releasable clamp in accordance with claim 3, in which said actuator engages said jaw at a side of said outwardly arched portion remote from said pivot.

6. A releasable clamp for an adjustable tread wheel characterized by an inclined rail on its rim actuated upon relative rotation of the rim and a coaxial body to adjust the rim axially on the body, said clamp comprising a jaw fulcrumed at one end on said body, and an actuator reacting against said body and engaging said jaw adjacent an opposite end to operate the same as a second class lever, said jaw having clamping action on said rim at an intermediate portion thereof.

7. A releasable clamp for an adjustable tread wheel characterized by an inclined rail on its rim actuated upon relative rotation of the rim and a coaxial body to adjust the rim axially on the body, said clamp comprising a radially outwardly arched jaw fulcrumed at one end on said body, and an actuator reacting against said body and threadedly engaging said jaw adjacent an opposite end to operate the same as a second class lever, said jaw having clamping action on said rim at the intermediate arched portion thereof.

8. A releasable clamp for an adjustable tread wheel characterized by an inclined rail on its rim actuated upon relative rotation of the rim and a coaxial body to adjust the rim axially on the body, said clamp comprising a radially outwardly arched jaw fulcrumed at one end on said body, and an actuator reacting against said body and threadedly engaging said jaw adjacent an opposite end to operate the same as a second class lever, said jaw straddling said rail and having clamping action on said rim at the intermediate arched portion thereof.

References Cited in the file of this patent

UNITED STATES PATENTS 2,417,139     Strehlow _____ Mar. 11, 1947

FOREIGN PATENTS 804,145     France _____ July 27, 1936